Figure 6:
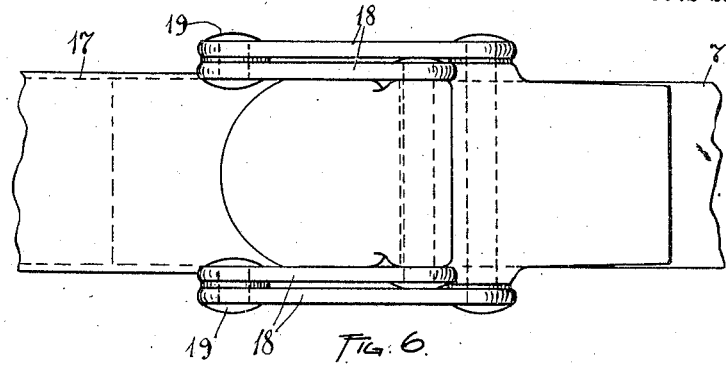

Oct. 16, 1923.
C. R. ALLEN
FOLDABLE VEHICLE TOP
Filed March 12, 1918
1,470,589
3 Sheets-Sheet 1
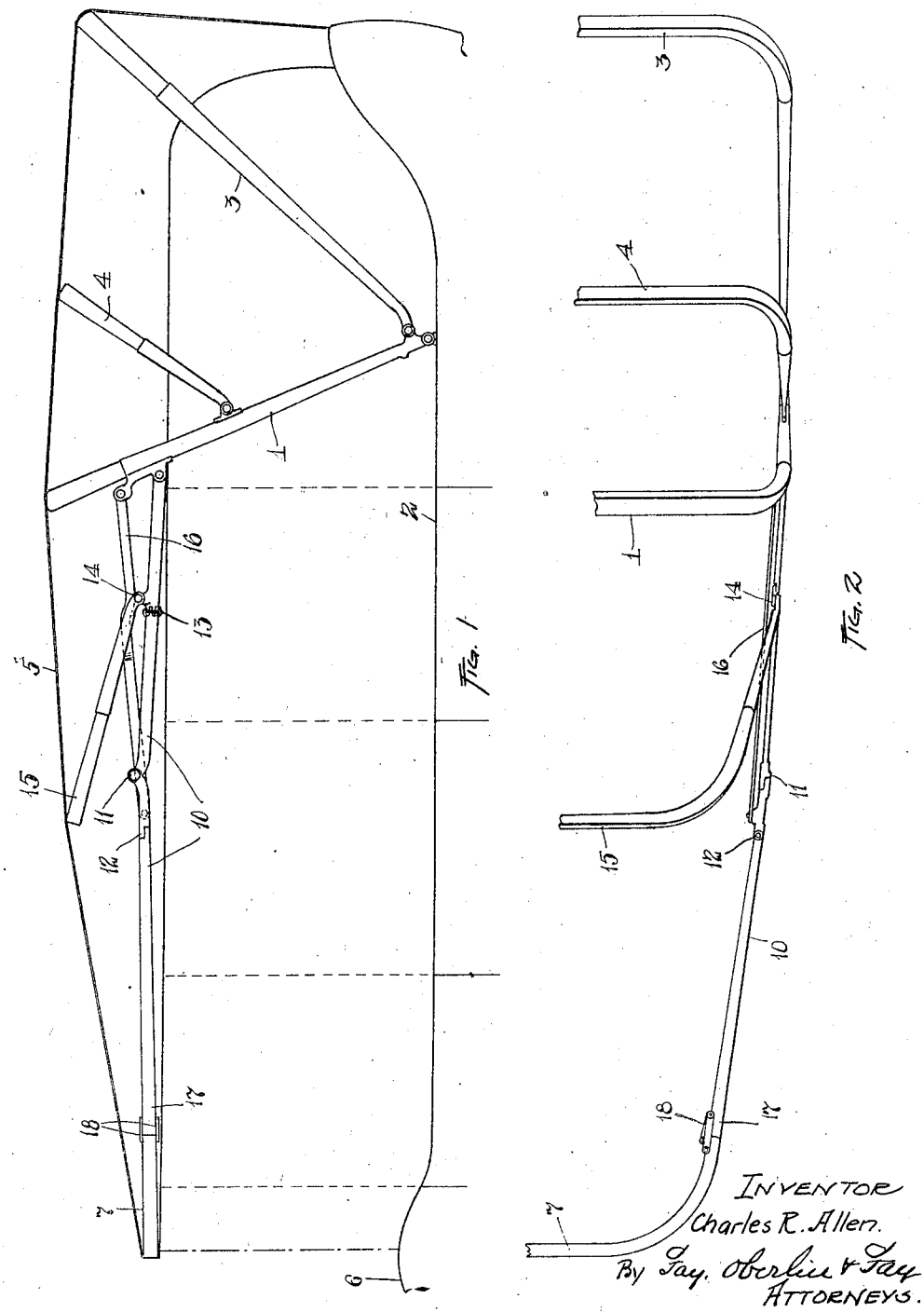
INVENTOR
Charles R. Allen.
By Jay, Oberlin & Fay
ATTORNEYS.

Oct. 16, 1923. 1,470,589
C. R. ALLEN
FOLDABLE VEHICLE TOP
Filed March 12, 1918 3 Sheets-Sheet 2
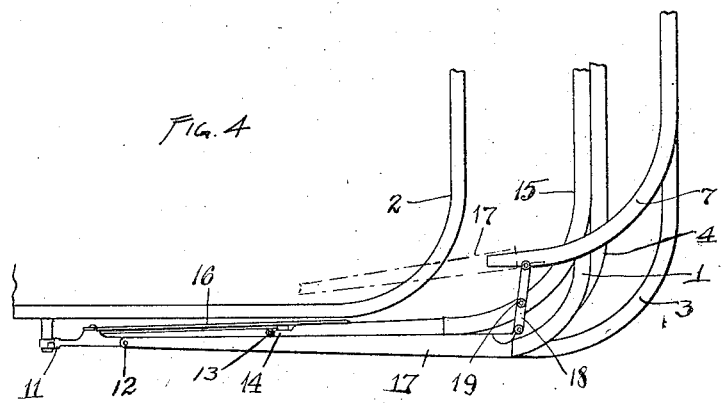
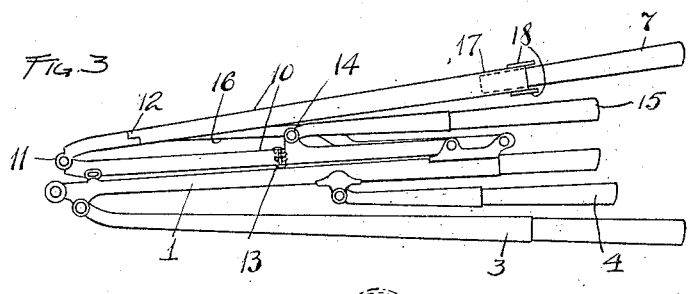
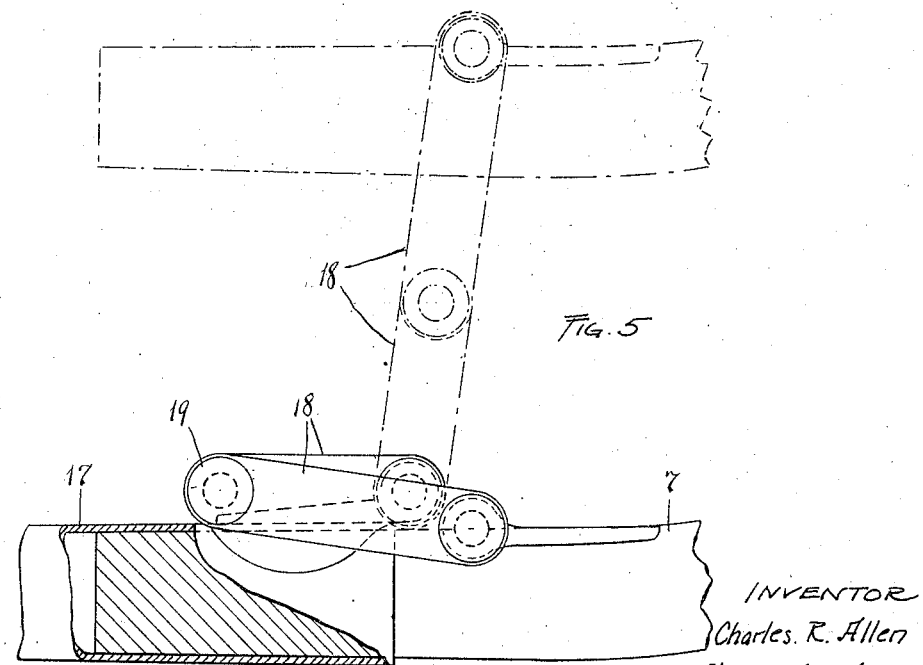
INVENTOR
Charles. R. Allen
By Fay, Oberlin & Fay
ATTORNEYS.

Oct. 16, 1923. 1,470,589
C. R. ALLEN
FOLDABLE VEHICLE TOP
Filed March 12, 1918 3 Sheets-Sheet 3

INVENTOR
Charles R. Allen
By Fay, Oberlin & Fay
ATTORNEYS.

Patented Oct. 16, 1923.

1,470,589

UNITED STATES PATENT OFFICE.

CHARLES R. ALLEN, OF ASHTABULA, OHIO, ASSIGNOR TO THE ASHTABULA BOW SOCKET COMPANY, OF ASHTABULA, OHIO, A CORPORATION OF OHIO.

FOLDABLE VEHICLE TOP.

Application filed March 12, 1918. Serial No. 222,025.

*To all whom it may concern:*

Be it known that I, CHARLES R. ALLEN, a citizen of the United States, and a resident of Ashtabula, county of Ashtabula, and State of Ohio, have invented a new and useful Improvement in Foldable Vehicle Tops, of which the following is a specification, the principle of the invention being herein explained and the best mode in which I have contemplated applying that principle, so as to distinguish it from other inventions.

In adapting the so-called cape top to use on automobiles and like vehicles, a number of improvements have been made, so that this type of top constitutes practically the only kind of foldable top in current use in the connection stated. Especially where, as in the modification known as the "one man" top, the necessity for independently supporting the forward bows on the vehicle body has been done away, this type of top presents many advantages over the permanent or sedan type. The latter, of course, cannot be folded, and presents the further disadvantage that it requires to be more solidly built than the folding type of top, necessitating a special construction of the frame in the body of the vehicle, as well, in order to support such top, and in other ways the cost of manufacture of the vehicle is materially increased. At the same time, owing to its increased weight, a top of this sort, even when constructed in the best fashion, imposes a severe strain on the body, especially in traveling over rough roads, and tends to sway the body unduly, as well as produce unnecessary noise.

In contradistinction to such permanent tops, the cape top is extremely light and flexible, and in addition presents the very great convenience, in the eyes of many users, that it can be folded up, leaving the occupants of the vehicle in the open. The chief objection that exists to this type of top is that where, as is almost universally the case, the body of the vehicle is narrower at the front than at the rear, it has not been heretofore found possible to conform the top to the shape of the vehicle. In other words, the forward bows of the top, in order to be folded up with the rear bows, have had to be of approximately the same width, and so the front of the top in its extended or open condition projects laterally of the body a considerable distance on each side. The result is not only a somewhat ungainly appearance, but also increased surface is presented to the air, the side curtains when attached flare outwardly, and the extension doors, where provided, do not operate smoothly for the same reason.

The object of the present invention accordingly is to provide a foldable top, particularly of the so-called "one man" type, that will conform to a vehicle body narrower at one end than at the other, without interfering either with the ease of folding, or obstructing in any way the rear portion of the vehicle body, when it is folded.

To the accomplishment of the foregoing and related ends, said invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings:—

Figure 7:
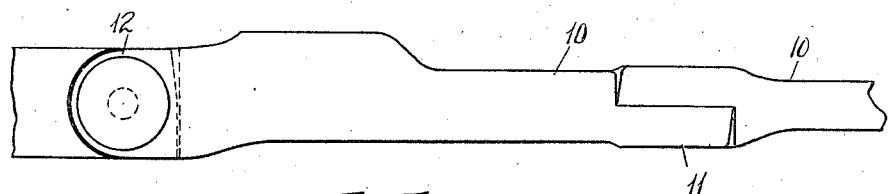
Figure 8:
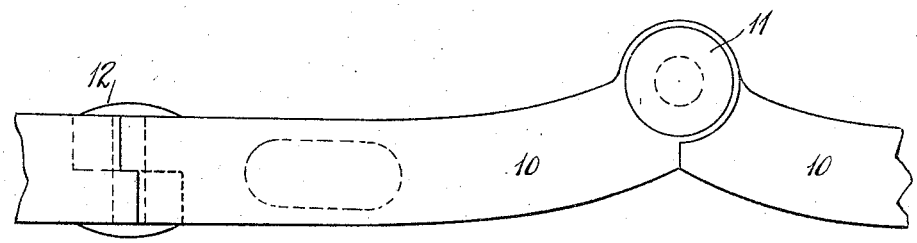
Figure 9:
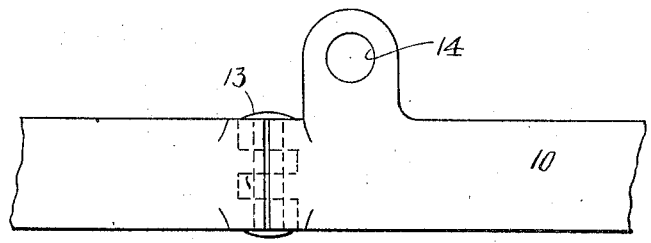
Figure 10:
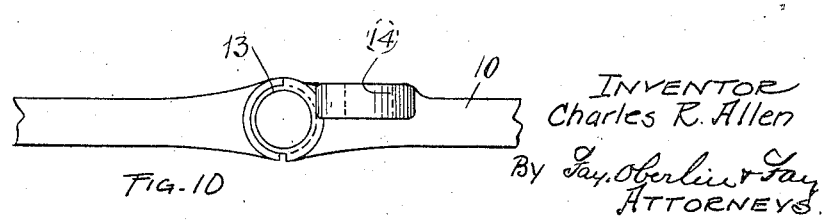

Fig. 1 is a side elevation of a vehicle top, embodying my improvements, said top being shown in its open or extended condition on a motor vehicle body of conventional form; Fig. 2 is a plan view of such improved top, or rather of one side of the same, the other side being a duplicate; Fig. 3 is a side elevation of said top in its folded condition; Fig. 4 is a plan view of the same in folded condition; Fig. 5 is a plan view of the flexible connection between the extreme forward or outrigger bow and the swinging arms that carry the same; Fig. 6 is an inside elevational view of such connection; Fig. 7 is a plan view and Fig. 8 is a side elevational view of two joints in the swinging supports for such outrigger bow; and Figs. 9 and 10 are similarly a plan view and side elevation of a third joint in such swinging supports.

As in most types of "one man" top, I utilize in the framework of the present improved top a forward main bow 1 pivotally attached to the body 2 of the vehicle adjacent the rear seat, where such vehicle is a two-seated one, as illustrated in Fig. 1. Other familiar parts are the rear main bow 3, which is preferably pivotally attached to such forward main bow near the lower end of the latter, and in addition a supplemental bow 4 may be provided between such two main bows, if desired, being shown for illustrative purposes in the figure named as pivotally attached to the forward main bow 1.

All three of the bows thus described will be of approximately the same width and so adapted to fold up and drop clear of the body line, as shown in Fig. 4.

The portion of the structure of present interest is the forwardly extending frame, whereby that portion of the top covering 5 that projects over the front seat is supported. As previously indicated, the forward portion of the body of the modern automobile almost invariably is narrower than the rear, the side lines of the body curving inwardly to the cowl or dash 6, so that the front seat, as is well known, is adapted to accommodate only two persons, while three may be seated in the rear. If this portion of the top, accordingly, is to conform to the body, the several bows included in this forwardly extending frame structure will require to be narrower than those in the rear part of the top frame. Particular difficulty arises in connection with the extreme forward or outrigger bow 7, as it is termed, since the arms which support the same, when folded up, will lie across the rear corners of the body, thus not only obstructing the rear seat, but preventing the complete collapsing of the top itself.

With the object in view of avoiding this difficulty, I construct the arms in question so that they not only fold up in a vertical plane, but also bend inwardly in a horizontal plane, and I connect the outrigger bow with such arms in such fashion that the outer ends of the latter may be shifted transversely with respect to said bow, in order that they may fall without the sides of the body, and at the same time carry the bow clear of the rear of the body.

In the preferred construction illustrated, said supports comprise arms 10 pivotally attached at their inner ends to the forwardly extending main bow 1 at points just above the side edges of the top cover, so as to swing vertically. Each such arm is jointed intermediately of its ends about a horizontal axis, the joint 11 being a stop or lock joint, that serves to prevent upward bending of the arm when extended in the substantially horizontal position illustrated in Fig. 1. In addition to the joint 11, just referred to, the respective portions of each arm are jointed about vertical axes 12 and 13, so as to be capable of being flexed inwardly. The details of the horizontally turning joint 12 in the front portion of the arm, as well as of the vertically swinging stop joint 11 are shown in Figs. 7 and 8. Details of the horizontal swinging joint 13 in the rear portion of the arm are shown in Figs. 9 and 10. From the foregoing figures, it will be seen that both said horizontal swinging joints also include a stop feature, which prevents bending of the joint beyond a certain point, and in fact, only a very slight amount of bending is necessary.

The horizontal swinging joint 13 in the rear portion of the arm is preferably located just forwardly of the point 14 to which the supplemental bow 15 is pivotally attached to said arm-portion. This bow 15 accordingly serves to steady the arms and hold the rear portions thereof back of such horizontal swinging joints a proper distance apart. Said bow extends forwardly at an angle to the arm just described as carrying the outrigger bow 7, so as to support the cover, in the extended condition of the top, at a point approximately midway between such outrigger bow and the main bow 1. It will be understood that suitable braces will be employed to assist in supporting said arms and supplemental bow, as well as to operatively connect the same in order to facilitate the folding of them together, when the top is to be closed.

The brace means shown are to be considered merely illustrative, consisting of a long link 16 that is pivotally attached at one end to the main bow some distance above the point of attachment of the swinging arm thereto, and at the other end to the arm, a short distance forwardly of the vertically swinging joint 11 therein. It will also be desirable to provide some sort of connection between the supplemental bow and the long link or brace, either direct or by means of a short link or otherwise, as will be understood by those skilled in the art, so that such intermediate bow will be folded up in unison with the outrigger bow when the swinging arms are dropped.

The outer ends 17 of the swinging arms are in the form of sockets, in which the ends of the outrigger bow 7 are adapted to seat directly, when said sockets are positioned the proper distance apart. In order to lock the bow in such seated position, as well as to flexibly connect the same with the sockets in its unseated position, articulated links 18 are provided, as shown in detail in Figs. 5 and 6. A pair of such links, in fact, is employed to divide the strain, one lying on each side, that is, above and below the socket and bow, to which they are respectively attached at their outer or free ends. The operation of these links, both in holding the outrigger bow in its seated position and when unseated, and placed laterally with respect to the sockets, should be readily apparent from an inspection of the figures just named, it being noted that in the seated position of the bow, the intermediate joint or articulation 19 in the links is swung across a center line connecting the outer ends of said links, their locking action being due to this fact.

The general mode of operation of my improved top should be readily understood from the foregoing description of the construction and mode of operation of the several parts. Assuming the frame to be in its extended or open condition shown as in Fig. 1, should it be desired to fold the same, the horizontal swinging joints 11 in the arms 10, that support the outrigger bow 7 are broken downwardly, so as to cause the forward portion of the top to collapse. It will be understood that the outrigger bow will be preferably tied down to the body either directly or through the windshield frame, when the top is up, i. e., in extended position.

As the side arms are broken downwardly, the outrigger bow 7 and supplemental bow 15 assume a parallel relation to the forwardly extending main bow 1 and may thereupon be swung back, along with the latter, onto the rear main bow 3, thus causing the whole top to drop down back of the body. As thus folded back, the swinging side arms 10 will lie across the rear corners of the body, as shown in dotted outline in Fig. 4, but by simply disengaging the outrigger bow 7 from the respective sockets 17, in which it is normally seated, such sockets may be straightened out through the actions of joints 12 and 13 so as to lie parallel with the remaining parts of the arms, as shown in full lines in said Fig. 4, and the outrigger bow thus carried, through the medium of the links 18, entirely clear of the body.

It will be understood that the cover material is attached to the front bow only so far around the respective ends thereof as not to interfere with the folding of the top in the fashion just described. This, as a matter of fact, is very easily arranged.

In the extended condition of the top, as clearly shown in Fig. 2, it will be seen that the frame gradually narrows toward the front, so as to conform with an assumed body line. In its extended or open condition accordingly, the top if properly fitted or padded will present very much the appearance of a sedan top. It is, however, obviously very much lighter than any so-called permanent type of top construction and, in addition, possesses the advantage of being foldable, so that it can be dropped entirely out of the way when not desired.

Moreover, by reason of the conformation of the side lines of the top to those of the body, both of the doors, and particularly the fore-door, may be provided with extensions to carry the corresponding parts to the side-curtains, as indicated in dotted outline in Fig. 1, without encountering the difficulty of having such extensions flare outwardly, in other words, the curtains carried by the doors will swing about the same axes as the doors themselves, and not have to buckle and bend as in the prevailing construction, with the result that they do not fit snugly and tend to break the transparent panes of celluloid inserted therein.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a top for vehicles and the like, the combination with a pair of pivotally supported sockets; of a bow having its ends formed to engage said sockets, respectively; and independent means connecting said bow with said sockets adapted to support the former from the latter when such ends are disengaged therefrom.

2. In a top for vehicles and the like, the combination with a pair of pivotally supported sockets; of a bow having its ends formed to engage said sockets, respectively; and transversely adjustable connections between said bow and sockets adapted to support the former from the latter when such ends are disengaged therefrom.

3. In a top for vehicles and the like, the combination with a pair of pivotally supported sockets; of a bow having its ends formed to engage said sockets, respectively; and articulated links connecting said bow with said sockets adapted to support the former from the latter when such ends are disengaged therefrom.

4. In a top for vehicles and the like, the combination with a pair of pivotally supported sockets; of a bow having its ends formed to seat in the ends of said sockets, respectively; and articulated links connecting said bow with said sockets, respectively, the parts of said links being adapted to swing past center when said bow is in seated position so as to lock the same in such position.

5. In a top for vehicles and the like, the combination with a pair of vertically swinging arms; of sockets attached to said arms so as to be transversely oscillatory thereof; a bow having its ends formed to engage said sockets, respectively; and independent means connecting said bow with said sockets adapted to support the former from the latter when such ends are disengaged therefrom.

6. In a top for vehicles and the like, the combination with a pair of vertically swinging arms; of sockets attached to said arms so as to be transversely oscillatory thereof; a bow having its ends formed to engage said sockets, respectively; and transversely adjustable connections between said bow and sockets adapted to support the former from the latter when such ends are disengaged therefrom.

7. In a top for vehicles and the like, the combination with a pair of vertically swinging arms; of sockets attached to said arms so as to be transversely oscillatory thereof; a bow having its ends formed to engage said sockets, respectively; and articulated links connecting said bow with said sockets adapted to support the former from the latter when such ends are disengaged therefrom.

8. In a top for vehicles and the like, the combination with a pair of vertically swinging arms; of sockets attached to said arms so as to be transversely oscillatory thereof; a bow having its ends formed to seat in the ends of said sockets, respectively; and articulated links connecting said bow with said sockets, respectively, the parts of said links being adapted to swing past center when said bow is in seated position so as to lock the same in such position.

9. In a top for vehicles and the like, the combination with a main bow; of arms pivotally attached at their inner ends to said main bow, so as to swing vertically, each such arm being jointed intermediately of its ends about both a vertical and a horizontal axis, the free ends of said arms being in the form of sockets; an outrigger bow having its ends formed to seat in such sockets, respectively; and articulated links connecting said outrigger bow with said sockets, the parts of said links being adapted to swing past center when said bow is in seated position so as to lock the same in such position.

Signed by me, this 9th day of March, 1918.

CHARLES R. ALLEN.